US012771129B2

(12) United States Patent
Danesh-Bahreini et al.

(10) Patent No.: US 12,771,129 B2
(45) Date of Patent: Oct. 20, 2026

(54) SYSTEMS AND METHODS FOR POWER RESILIENCY

(71) Applicants: Mohammed Vahid Danesh-Bahreini, Bellevue, WA (US); Bahareh Danesh-Bahreini, Kirkland, WA (US); Kaveh Danesh, San Fransisco, CA (US)

(72) Inventors: Mohammed Vahid Danesh-Bahreini, Bellevue, WA (US); Bahareh Danesh-Bahreini, Kirkland, WA (US); Kaveh Danesh, San Fransisco, CA (US)

( * ) Notice: Subject to any disclaimer, the term of this patent is extended or adjusted under 35 U.S.C. 154(b) by 0 days.

(21) Appl. No.: 19/029,269

(22) Filed: Jan. 17, 2025

(65) Prior Publication Data

US 2025/0239850 A1 Jul. 24, 2025

Related U.S. Application Data

(60) Provisional application No. 63/624,920, filed on Jan. 25, 2024, provisional application No. 63/623,473, filed on Jan. 22, 2024.

(51) Int. Cl.

| | |
|---|---|
| ***H02J 3/001*** | (2026.01) |
| ***H01M 10/42*** | (2006.01) |
| ***H01M 10/46*** | (2006.01) |
| ***H01M 10/48*** | (2006.01) |
| ***H02J 3/0073*** | (2026.01) |
| ***H02J 3/32*** | (2026.01) |
| ***H02J 3/38*** | (2026.01) |
| ***H02J 101/24*** | (2026.01) |
| ***H02S 50/00*** | (2014.01) |
| ***H04W 24/02*** | (2009.01) |

(52) U.S. Cl.

CPC ........... *H02J 3/001* (2020.01); *H01M 10/425* (2013.01); *H01M 10/46* (2013.01); *H01M 10/482* (2013.01); *H02J 3/0073* (2020.01); *H02J 3/32* (2013.01); *H02J 3/38* (2013.01); *H04W 24/02* (2013.01); *H01M 2010/4278* (2013.01); *H02J 2101/25* (2026.01); *H02S 50/00* (2013.01)

(58) Field of Classification Search

None

See application file for complete search history.

(56) References Cited

U.S. PATENT DOCUMENTS

2011/0227414 A1* 9/2011 Fischer ..................... H02J 7/52 307/66
2014/0252859 A1* 9/2014 Chisenga ................ H02J 3/381 307/43
2017/0331326 A1* 11/2017 Hanley ................ H04B 10/807

* cited by examiner

*Primary Examiner* — Menatoallah Youssef
*Assistant Examiner* — Aqeel H Bukhari
(74) *Attorney, Agent, or Firm* — EASTGATE IP; Scott R. Seeley

(57) ABSTRACT

The present disclosure relates to systems, methods, software, hardware, and techniques for improving power resiliency of small compounds with an emphasis on wireless cell towers and data centers. The power resiliency measures relate to software solutions for power resilience, and hardware/software solutions for crisis mitigation.

15 Claims, 13 Drawing Sheets

SYSTEMS AND METHODS FOR POWER RESILIENCY

PRIORITY CLAIM

This application claims the benefit of U.S. Provisional Application No. 63/623,473 filed on Jan. 22, 2024, which is incorporated herein by reference in its entirety and also claims the benefit of U.S. Provisional Application No. 63/624,920 filed on Jan. 25, 2024, which is also incorporated herein by reference in its entirety.

BACKGROUND

The world is facing an unprecedented demand for energy, and governments and private organizations are tasked with the challenge of meeting this demand while maintaining environmental sustainability and controlling costs. Energy consumption patterns play a significant role in this equation, with peak demand hours placing a significant strain on energy supply systems and leading to higher energy costs.

Weather patterns can also significantly affect energy usage and availability, with inclement weather such as storms leading to power outages and heightened energy costs. There is a need for an energy management system that can monitor energy usage and weather patterns to optimize energy costs and availability.

In the last two decades, the energy demands of wireless networks have multiplied by ten, and by 2030 there is expected to be a twenty-fold surge in global data traffic as compared to 2018.

SUMMARY

In various configurations, the present disclosure relates to a method of mitigating the effect of power disruptions at cellular transmission sites, the method comprising: initializing a software module at the Operations Support System (OSS) or Open Radio Access Network (ORAN) at the cellular transmission site; the software module querying a database for power disruption information; the database providing a response to the query for power disruption information to the software module; based on the database response to the query for power disruption information, the software module querying one or more maintenance dispatch facilities to take one or more maintenance dispatch actions; and the software module further being configured to: detect a power disruption, and in response to the detected power disruption, implement one or more resilience commands.

In some embodiments, wherein the maintenance dispatch actions include: (i) deploying mobile generators to the affected cellular transmission site; (ii) activating backup power systems, including lead-acid or lithium-ion battery systems, at the affected cellular transmission site; (iii) initiating remote diagnostics and troubleshooting procedures to identify and address issues related to the power disruption; and (iv) notifying field maintenance personnel to perform on-site inspections and repairs as necessary.

In some configurations, the resilience commands include: switching the cellular transmission site to an alternative power source to maintain continuous operation; optimizing energy consumption by adjusting the operational parameters of the cellular transmission equipment to reduce power usage during the disruption; rerouting data traffic to neighboring cellular transmission sites to balance the load and maintain service continuity; and activating emergency communication protocols to ensure critical messages and alerts are delivered during the power disruption. the alternative power sources may include battery backup power, solar power, or generator power.

In some embodiments, the present disclosure relates to an MPPT Charge Controller configured for integration at a cellular transmission site, the MPPT Charge Controller comprising: a power input; network connections; battery monitoring inputs; connections to loads; connection to receive solar panel output; connection to the terminal alarm box; and connection to the OSS. In some embodiments, the MPPT Charge Controller is further configured to alert a maintenance dispatch upon detecting battery defects. In various configurations the detection of battery defects includes comparing the sum of two batteries' voltages with the sum of another two batteries' voltages within the same string, and being configured to alert if the two sums differ by a predefined voltage value.

The MPPT Charge Controller can also be configured to detect and optimize solar panel output. The MPPT Charge Controller can also be configured to optimize solar panel output by rotating the assembly or by switching the connections between panels in the array between series and parallel configurations depending on the detected optimal output configuration. In some configurations the solar panel array is configured in a hexagonal, diamond, triangular, trapezoidal, square, and/or rectangular shape.

In still further embodiments, the present disclosure relates to a system for enhancing energy resilience and optimizing energy consumption, the system comprising: a utility power source; a plurality of solar assemblies providing a solar PV output; a PV assigned power monitoring unit connected through a PV assigned toggle switch to the solar PV output; an MPPT charge controller connected to the PV assigned power monitoring unit, and configured to optimize the output of the solar assemblies; a string of batteries connected through a battery assigned toggle switch to a battery assigned power monitoring unit, the battery assigned power monitoring unit further connected to a negative busbar; the battery assigned toggle switch further connected to a positive busbar; and wherein the MPPT charge controller is further connected to the positive busbar and the negative busbar through a redundant relay system comprising at least: Redundant Relay 1 and Redundant Relay 2.

In some embodiments, the redundant Relay 1 and Redundant Relay 2 are configured to operate at a threshold voltage of 43 VDC to prevent photovoltaic (PV) battery charging, and further configured to disconnect the battery at a threshold voltage of 42 VDC during power outage conditions. In some embodiments, The redundant Relay 1 and Redundant Relay 2 are configured to operate at 43 VDC to prevent PV battery charging and to turn off below 43 VDC.

Likewise, in some configurations the MPPT charge controller is configured to monitor battery health via battery monitoring inputs, and in some embodiments, the MPPT charge controller is configured to alert a maintenance dispatch if an issue with battery health is detected. In still further configurations, the MPPT charge controller is configured to optimize the output of the solar assemblies. For instance, the MPPT charge controller may be involved in controlling rotation of the assembly; and switching the connections between panels in the array between series and parallel configurations; depending on the detected optimal output configuration.

In this manner, the presently disclosed system allows for efficient use of solar energy during normal operation, and facilitates storage of energy during low demand periods for use during high demand periods, inclement weather, and/or crisis situations.

DETAILED DESCRIPTION

Figure 1:
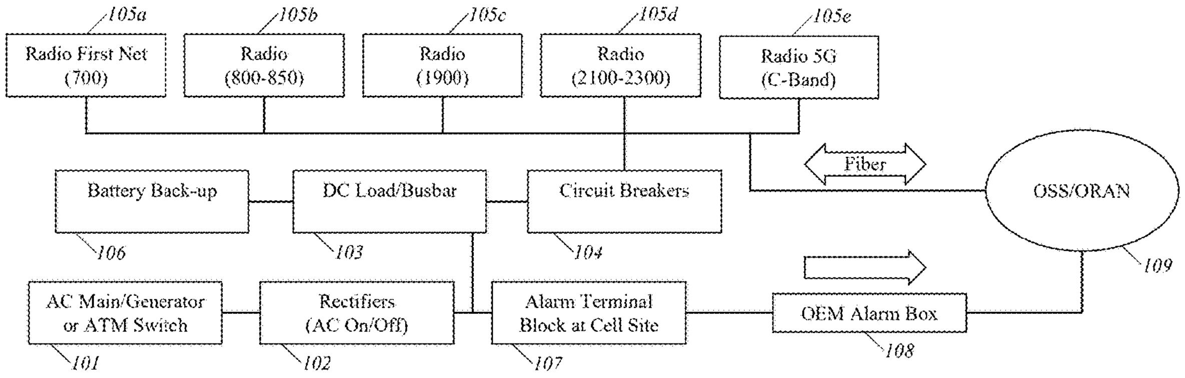
FIG. 1 shows a telecom system power diagram.

The present disclosure pertains to systems designed to enhance energy resiliency during inclement weather or crises, while also optimizing energy consumption and availability. In various configurations, this system utilizes computer controllers interfaced with weather monitors, solar panels, and batteries. It efficiently stores energy during periods of low demand, such as overnight, for use during high demand periods, inclement weather, or crises.

Energy costs are variable, fluctuating year to year and, in some instances, hour by hour. All states exhibit peak and non-peak hours, with electricity rates influenced by supply and demand, leading to monthly and yearly price variations. Peak hours typically incur higher costs per kilowatt-hour. In some states, peak and non-peak hours vary between weekdays and weekends, and seasonally, with colder months generally being more expensive. Additionally, peak hours often coincide with busy periods for mobile users, contributing to increased energy costs during these times.

These fluctuations in energy costs significantly impact the operational expenses of wireless carriers. Prior to the deployment of 5G MIMO technology, mobile operators expended approximately $78 billion on radio access network energy costs, which accounted for 5% of their operating expenditures. With the full deployment of 5G massive MIMO, cell site power consumption is expected to double in the coming years.

Global monthly mobile data usage is projected to increase fivefold by 2026 compared to 2020. Consequently, telecom providers anticipate a 150-170 percent increase in energy costs by 2026 with the advent of 5G technology.

Network service is a critical component of modern life and public safety. Approximately 80% of 911 calls are made using cell phones, and public agencies rely on phone notifications for issuing evacuation orders.

In 2021, U.S. electricity customers experienced an average of seven hours of power interruptions. Power outages can be categorized into two main types: those without major events (such as storms, heavy snow, or high winds), which occur more frequently but are shorter in duration (typically less than eight hours in 43 states), and those associated with major events (such as disasters, super storms, tornadoes, major flooding, and major fires), which are less frequent but can result in prolonged outages lasting over eight hours to several days.

Tornadoes causing major power outages predominantly occur between March and June, with peak occurrences in the Southern plains states (Kansas, Oklahoma, and Texas). These states also experience high sun peak hours, making solar energy a viable option during these months.

The National Weather Service, part of Weather.gov, provides early warnings for potential wildfires and other severe weather conditions, with continuous updates.

According to the National Interagency Fire Center (NIFC), approximately 60,000 wildfires burn 8 million acres in the U.S. annually. While the total number of wildfires has decreased by about 25% over the past decade, they have become more destructive and deadly.

In 2022, nearly 65,000 wildfires occurred nationwide, burning over 7 million acres—the highest since 2017. The year 2020 also saw four of the five largest wildfires in California's history, collectively burning over 2 million acres and causing billions of dollars in property damage. Approximately 90% of wildfires are caused by human activities, but lightning strikes account for more than half of the burned acreage each year. The 2020 August Complex fire, a lightning strike wildfire, burned over 1 million acres.

The National Weather Service provides geographically specific storm-based warnings for tornadoes, wildfires, thunderstorms, and floods. Power outages can disrupt wireless connections, leading to loss of connectivity during critical emergency conditions. Power outages inevitably cause cell site outages, which can significantly impact public safety and communication.

The performance of current battery backup systems during network outages is suboptimal. For instance, during the 2018 fire disaster, many residents lost access to wireless devices and were unable to receive emergency evacuation texts or report urgent issues. Typically, between 3% to 9% of cell sites may become inoperative during such events.

Deploying hundreds of mobile generators during power outages presents logistical challenges, especially when cell phone communications are disrupted. Some sites may be located within evacuation zones due to fire or flood, while others may be difficult to access. Lead-acid backup batteries, commonly used in these systems, often fail during disasters due to high maintenance requirements and various operational issues.

There are numerous benefits to storing solar energy. Stored solar energy can bridge gaps in power production on days with limited sunlight, especially during power outages. Utilizing stored solar energy reduces reliance on the energy grid, thereby lowering energy costs. It also balances electrical loads by storing electricity during low-demand periods and using it during high-demand times.

Currently, the use of solar energy at wireless carrier cell tower locations is limited. Some carriers invest in solar farms to reduce electricity costs by selling and buying power from the grid. However, this does not address grid power outages and the resulting loss of network connectivity during emergencies.

Power outages have significant implications for public safety. During the 2018 California fire disaster, it was noted that 3% to 9% of cell sites may become inoperative. Residents lost access to wireless devices, preventing them from receiving emergency evacuation texts or reporting urgent needs. Additionally, deploying mobile generators was impractical, particularly in evacuation zones or inaccessible locations.

One approach to addressing power outages and providing battery backup involves the preparation and performance of wireless carriers, especially during natural disasters or grid shutdowns due to storms, heavy snow, super storms, floods, and fires. Typically, cell tower sites rely on multiple sources of energy, including AC grid power, lead-acid backup batteries, a combination of AC grid power with lead-acid batteries and generators, and the option to deploy mobile generators for outages lasting more than four hours. Some sites may rely solely on primary and secondary generators when AC grid power is unavailable.

Existing backup power systems using lead-acid batteries have inherent performance limitations. These batteries generate significant heat during charging, necessitating a cooldown period. They also require frequent maintenance to prevent deep discharge and extend their lifespan. Additionally, lead-acid batteries cannot operate continuously for 24 hours, resulting in lengthy downtimes. Typically, they can be used for eight hours, followed by an eight-hour charging period and an eight-hour cooldown period.

Various power system configurations are available for powering cell towers during daily operations or AC grid power outages. However, natural disasters such as storms, heavy snow, super storms, floods, and fires demand a different approach. Approximately 75% to 80% of cell sites rely on fixed generators that provide power for 24 to 72 hours on a single fuel tank, based on an estimated usage of 37 hours per tank. Conversely, 15% of cell sites rely on lead-acid batteries that last for four hours if no permanent generator is available. If a site has a fixed generator, lead-acid battery backup can provide power for two hours. For sites without fixed generators, portable generators must be delivered within four hours.

Lithium-ion batteries offer several advantages, including minimal downtime for charging, no memory effect allowing partial charges, a long lifespan of up to 6000 cycles, and a higher power density contributing to longer battery life. These batteries also experience a slower rate of capacity loss and are capable of lasting over 13 years without replacement when used in electric vehicles. Additional benefits of lithium-ion batteries include fast charging times, resilience to extreme temperatures, continuous operation for 24 hours with minimal downtime, eight hours of use with just one hour of charging, no required cooldown period, and protection from low charge via a Battery Management System (BMS). Furthermore, lithium-ion batteries are compatible with solar panel charging, making them an efficient and reliable choice for power backup systems.

In various configurations, the present disclosure describes a system that leverages the advantages of lithium-ion batteries to provide a robust energy resiliency solution. This system integrates solar panels, lithium-ion batteries, and sophisticated computer controllers to monitor and manage energy usage effectively. By storing solar energy during periods of low demand, the system ensures that sufficient power is available during high demand periods, inclement weather, or crises.

The system is designed to reduce operational costs by minimizing reliance on the energy grid and optimizing the use of stored solar energy. It also enhances the reliability and stability of wireless communication networks by providing a continuous power supply, even during prolonged power outages. This is particularly crucial for maintaining network service during natural disasters or other emergencies, where uninterrupted communication is vital for public safety.

The integration of lithium-ion batteries with solar panels and advanced control systems provides a scalable and efficient solution for energy management. This system can be deployed at various cell tower sites, offering significant improvements over traditional lead-acid battery backup systems. The enhanced performance, reduced maintenance requirements, and extended lifespan of lithium-ion batteries make them an ideal choice for modern energy resiliency applications.

In summary, the present disclosure provides a comprehensive solution for improving energy resiliency, optimizing energy consumption, and ensuring the availability of power during critical periods. By leveraging the benefits of lithium-ion batteries, solar panels, and advanced control systems, this system addresses the limitations of existing backup power solutions and offers a reliable and efficient alternative for wireless carriers and other critical infrastructure.

Figures and Certain Embodiments

FIG. 1 illustrates a power distribution and monitoring system for a telecommunications infrastructure, comprising various radio units operating at different frequency bands. The system includes an AC Main/Generator or ATM Switch connected to Rectifiers that manage AC power. The system includes a DC Load/Busbar that distributes power to the radios, while Circuit Breakers ensure protection. A Battery Backup provides power continuity, and an Alarm Terminal Block monitors site conditions. An OEM Alarm Box communicates with the OSS/ORAN for operational support and remote management via a fiber connection.

More specifically, FIG. 1 depicts an AC Main/Generator or ATM Switch 101 configured to provide the primary AC power to the system. If the compound is connected to the main electrical grid, the AC Main provides the primary source of alternating current (AC) power to the entire system. This component may include an automatic transfer switch (ATM) that switches between different power sources. In the absence of a reliable grid connection or during power outages, a generator can supply the necessary AC power to keep the telecommunications equipment operational. Here, it is notable that generators require maintenance and fuel which can complicate resiliency measures since fuel can go bad, and generator stations can be located in difficult to access locations, especially in the event of an emergency when roads may be closed or obstructed.

The system also includes Rectifiers (AC On/Off) 102 which are configured to convert AC (Alternating Current) power to DC (Direct Current) power. Here, the AC power from the AC Main or Generator is fed into the Rectifiers (102), which convert the AC power into direct current (DC) power needed for the telecommunications equipment. The rectifiers can be turned on or off based on the availability of AC power.

Also depicted is DC Load/Busbar 103 which distributes the DC power to various components of the system, ensuring a continuous power supply. The DC Load/Busbar 103 centralizes and distributes DC power from the rectifiers to various components. It ensures efficient power distribution, load balancing, and enhances system reliability by providing a central connection point for multiple power sources and loads.

The DC Load/Busbar 103 is connected to the Circuit Breakers 104 which protect the electrical circuits from overcurrent or short circuits, ensuring the safety and reliability of the system. Circuit breakers protect the electrical system from overcurrent situations such as short circuits or overloads. By automatically interrupting the flow of electricity when the current exceeds a certain threshold, they prevent damage to the equipment and reduce the risk of damage. Here, The circuit breakers are placed between the DC Load/Busbar 103 and the radios 105*a*-105*e*. This placement ensures that any overcurrent condition affecting the radios or other connected components can be quickly isolated to prevent damage.

Connected to the Circuit Breakers 104 are Multiple radios 105*a* through 105*e* operating at different frequencies. In some configurations, the radios may include Radio FirstNet® (700 MHz) 105*a*, Radio (800-850 MHz) 105*b*, Radio (1900 MHZ) 105*c*, Radio (2100-2300 MHZ) 105*d*, and Radio 5G C-Band 105*e*. The various radios are responsible for transmitting and receiving signals within their designated frequency band, enabling wireless communication between mobile devices and the telecommunications network. They manage different frequency bands to ensure efficient use of the spectrum and minimize interference. The radios support various services, including voice calls, text messaging, internet access, and other mobile data services.

The system also includes a Battery Backup 106 which can provide backup power in case of an AC power outage, ensuring continuous operation of the cell site. The primary function of the battery backup is to provide an uninterrupted power supply to the telecommunications equipment during power outages or when the main power sources (AC Main/Generator) fail. This ensures continuous operation of the telecommunication services. In scenarios where there is a brief interruption between switching from the main power supply to the generator, the battery backup can bridge this gap, ensuring that the equipment remains powered during the transition. The Battery Backup 106 is connected with the is DC Load/Busbar 103 which distributes the DC power to various components of the system in the event of a power outage.

The system also includes Alarm Terminal Block at Cell Site (Cabinet/Shelter) 107 which can send notifications of power outages to the OSS/ORAN. This block consolidates alarm signals and ensures timely communication of power issues. The primary function of the alarm terminal block is to aggregate alarm signals from various components within the cell site. These alarms can include power faults, equipment malfunctions, environmental conditions (like temperature and humidity), and security breaches. The terminal block distributes these alarm signals to the appropriate monitoring systems. This ensures that any issues are promptly detected and reported to the operations and maintenance teams. For example, the alarm terminal block can relay alarm signals to remote monitoring systems, such as the Operations Support System (OSS).

The system also includes an OEM Alarm Box 108 which receives notifications from the Alarm Terminal Block and forwards them to the OSS/ORAN system 109 for further action.

The OSS/ORAN (Operations Support System/Open Radio Access Network) 109 is a centralized system that monitors and manages the telecommunications network. It is notified of power outages to inform cell technicians, who may need to deploy a mobile generator to restore power and maintain continuous operation of the cell site. The system allows operators to detect, isolate, and resolve faults in the network.

The power system architecture illustrated in FIG. 1 exhibits significant inefficiencies and vulnerabilities. A primary concern is its susceptibility to power outages, which can substantially disrupt network operations and necessitate manual intervention for resolution.

Moreover, the traditional power system is inherently inefficient and lacks energy-saving measures. It predominantly relies on non-renewable energy sources and fails to integrate solar power or other sustainable energy solutions, resulting in elevated operational costs and a reduced measure of resiliency. Additionally, the conventional system lacks effective monitoring of battery health and status. This deficiency can lead to undetected battery degradation, potentially causing battery failure during critical periods. Similarly, fuel stored for backup generators can deteriorate over time, diminishing its effectiveness and reliability.

The traditional power system is also characterized by its reactive nature. It addresses issues only after they arise, rather than proactively preventing them. The system lacks capabilities for automatic preparation for potential outages, battery health monitoring, and proactive fuel management. This reactive approach can result in extended downtimes and increased operational challenges.

The present disclosure describes features that, individually or in combination, address and mitigate some or all of the aforementioned deficiencies.

Eco Mode

In some embodiments, the present system relates to an "Eco Mode Solution," wherein the systems described herein are configured to operate in a reduced power mode, optionally, with advanced warning from various databases. This reduced power mode may include reducing the transmission power, or completely disabling, one or more transmission units at a transmission site. In various configurations, any reduction in power prioritizes preserving the communication ability of emergency response teams, such as maintaining the use and capability of systems such as FirstNet®.

In certain configurations of the Eco Mode Solution, the system is designed to proactively implement power resiliency measures. For example, the OSS/ORAN may be configured to interface with databases or information streams, such as Weather.gov, enabling the system to anticipate and implement power resiliency measures. Such measures may include powering down non-essential components, reducing transmission power, ceasing transmission in certain frequencies, charging batteries to optimal levels, and initiating maintenance protocols.

One implementation of the presently disclosed Eco Mode Solution is to power down various radios to extend the life of the battery backup while preserving emergency communications for first responders, and if possible, the general public.

To minimize energy consumption at the cell tower while maintaining essential services such as text messaging, calls, and GPS location functionality during extended power outages, the system reduces operational speed to conserve energy. Additionally, the system implements carrier lockdown measures, selectively enabling only the primary carrier (e.g., 700 MHz) while deactivating other carriers to save energy during short-term power outages. For instance, in the case of AT&T, FirstNet® remains operational while all other bands are temporarily disabled.

For example, to implement the presently disclosed system, a publish/subscribe (Pub/Sub) alerting system is integrated into the existing BBU (Baseband Unit) and OSS (Operations Support System) of a given cell tower to respond to forecasted or actual short-term power outages. The OSS or ORAN system retrieves weather event data from weather.gov and publishes the information to the BBU. The BBU processes the weather alert and adjusts the transmit power levels of specific frequency bands or implements carrier lockdowns. These adjustments to power levels and carrier operations are tailored to mitigate the impact of weather-related alarms in coordination with each wireless carrier.

Various databases may be queried to obtain the relevant actionable data, and some examples include the National Weather Service such as the NOAA Storm Prediction Center, as well as Local Power Company updates, such as a Puget Sound Energy Outage Map. With advance notice of storms or potential outages, each station can independently call for service to dispatch fueling or generators or other necessary services to prepare the station for the outage.

Figure 2:
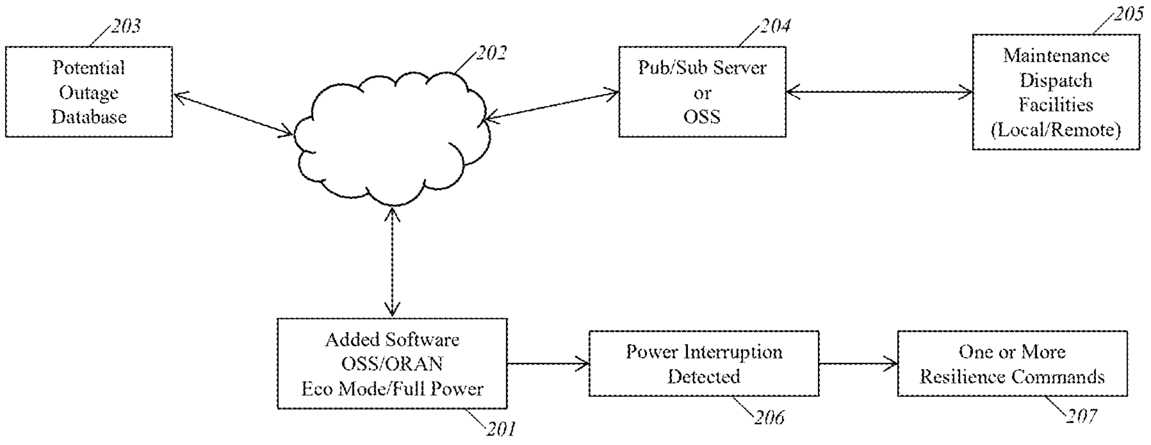
FIG. 2 shows the functionality of a software module added to a telecom power system.

FIG. 2 illustrates a software Eco Mode Solution, depicting the addition of a software module 201 integrated into the ORAN/OSS system for enhanced network management and monitoring. The software module 201 communicates with the internet or another network 202 to obtain updates from various databases 203, such as Weather.gov, to gather information regarding potential outages. Additionally, network 202 is connected to a publish/subscribe (pub/sub) service 204, which maintains site locations, zip codes, and other relevant information for each site. The pub/sub service 204 further communicates with local and remote facilities 205, including generators, service providers, and fuel dispatch centers, for the various sites. Upon detecting a power interruption 206, the software module 201 triggers one or more resilience commands 207 to maintain operational efficiency and minimize downtime. These resilience commands may include activating backup power sources, optimizing power consumption, deactivating certain bands, reducing transmission power, or dispatching maintenance teams as needed.

In this manner, in the event of an outage the software module 201 is configured to reduce the site load and extend the life of the station during the outage.

PV Charge Controller/MPPT Charge Controller

To further enhance system resiliency, solar power can be integrated into the system. The incorporation of solar power is advantageous for reducing the overall power load, providing additional redundancy, and improving system resilience in the event of an outage. Two mechanisms for integrating solar power in accordance with the present disclosure include a Photovoltaic (PV) Charge Controller and a Maximum Power Point Tracking (MPPT) Control Module, as described in detail below.

A PV Charge Controller is a component that regulates the power flow from the solar panels to the batteries and loads in a solar photovoltaic system.

Similarly, a MPPT Control Module, also known as the Maximum Power Point Tracking Control Module, is responsible for tracking the maximum power point of the solar panels in real time. It coordinates the operation of the solar panels, batteries, and loads in the system. By continuously adjusting the operating parameters of the solar panels, the MPPT Control Module maximizes the power output and efficiency of the system. In various embodiments, the MPPT is the brain of the photovoltaic system, it coordinates work of solar panels, batteries, and loads—it can detect power generation of solar panel in real time and optimize the system accordingly.

In various configurations, Maximum Power Point Tracking (MPPT) control is typically achieved through a DC conversion circuit. The photovoltaic cell array is connected to the load via this DC circuit. The MPPT controller continuously tracks the maximum power point of the solar panel in real-time to optimize the panel's efficiency. Higher voltages allow for greater power output through maximum power tracking, thereby enhancing charging efficiency. The MPPT solar controller can monitor the power generation voltage of the solar panel in real-time. It is utilized in solar photovoltaic systems to manage the operation of solar panels, batteries, and loads, effectively acting as the central control unit or "brain" of the photovoltaic system.

The MPPT can also be configured to monitor the status of batteries in a battery backup system. For instance, in some embodiments the MPPT charge controller monitors the batteries for defects by comparing the voltage sums of two batteries with the voltage sums of the other two batteries in the same string. If the difference exceeds a certain value, an alarm is triggered for battery replacement dispatch. The alarm can be sent to an OSS/ORAN system or a power management/dispatch company for maintenance.

For example, in one embodiment, When the AC main grid is operational, the Maximum Power Point Tracking (MPPT) controller powers the busbars whenever sufficient current is available at −56 VDC. When the AC main grid is off, the charged batteries and the MPPT controller supply power to the busbars. If the busbar voltage drops to 42 VDC, this indicates that the rectifiers are no longer powering the busbars and the batteries have been depleted to 42 VDC. At this point, the MPPT controller should enter standby mode and cease powering the busbars entirely to prevent intermittent power supply due to fluctuating photovoltaic (PV) power availability. When the busbar voltage reaches 56 VDC, this signifies that the AC power has been restored, and the MPPT controller should resume charging the busbars.

Figure 3:
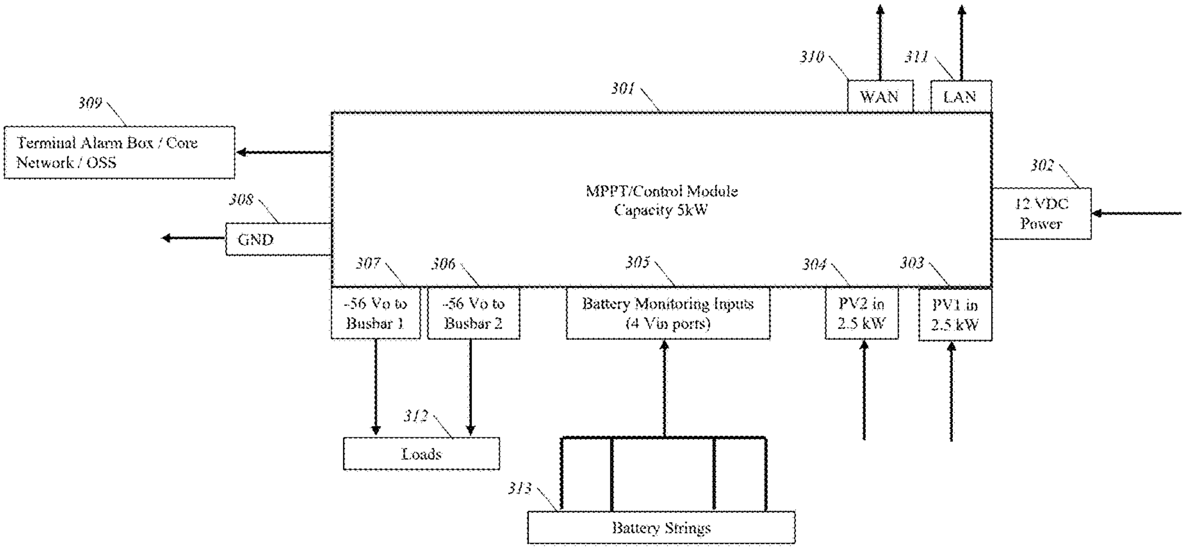
FIG. 3 shows one embodiment of an MPPT Control Module.

An example Maximum Power Point Tracking (MPPT) module is depicted in FIG. 3. The MPPT Module 301 is designed to optimize the power output from photovoltaic (PV) panels and manage the energy distribution within the system. The MPPT Module 301 includes certain following components.

The 12 VDC Power in 302 is a 12-volt direct current power source. It provides the necessary power to operate the MPPT module and its associated control circuitry.

The PV1 in up to 2.5 kW 303 input connects to the first photovoltaic (PV) panel in the system, which is capable of generating up to 2.5 kW of power. The MPPT module optimizes the power output from this PV panel to ensure maximum efficiency.

The PV2 in up to 2.5 kW 304 input connects to the second photovoltaic (PV) panel in the system, which can also generate up to 2.5 kW of power. Similar to the PV1 input, the MPPT module optimizes the power output from this PV panel.

The Battery Monitoring Inputs (4 Vin ports) 305 are four voltage input ports used for monitoring the batteries 313 in the system. The MPPT module continuously monitors the voltage levels of the connected battery strings to ensure proper charging and discharging, thereby maintaining the health and efficiency of the batteries.

The −56 Vo to Busbar 2 306 indicates a voltage of −56 volts direct current supplied to Busbar 2. The MPPT module regulates this output voltage to distribute power to various loads 312 connected to Busbar 2.

The −56 Vo to Busbar 1 307 indicates a voltage of −56 volts direct current supplied to Busbar 1. Similar to Busbar 2, the MPPT module regulates this output voltage to distribute power to various loads 312 connected to Busbar 1.

The GND connection 308 refers to the ground connection, which is used for electrical safety and stability. The ground connection ensures that the system is properly grounded to prevent electrical faults and provide a reference point for the electrical circuit.

The Connection to Terminal Alarm Box, MPPT Defect to Core Network/OSS System 309 is made to the terminal alarm box and is used to detect defects in the MPPT (Maximum Power Point Tracking) system and transmit the information to the core network or OSS (Operations Support System).

WAN Connection 310 and LAN Connection 311 interfaces connect the MPPT module to Wide Area Network (WAN) and Local Area Network (LAN) systems. They enable remote monitoring, control, and communication with other networked devices, facilitating efficient network management and data exchange.

In this manner, the MPPT module 301 integrates multiple inputs and outputs to manage power generation from PV panels, monitor battery status, and distributes power efficiently to the connected loads. It also interfaces with network systems to ensure comprehensive monitoring and control of the entire power management system.

Improved Systems Having PV/MPPT Charge Controllers

Figure 4:
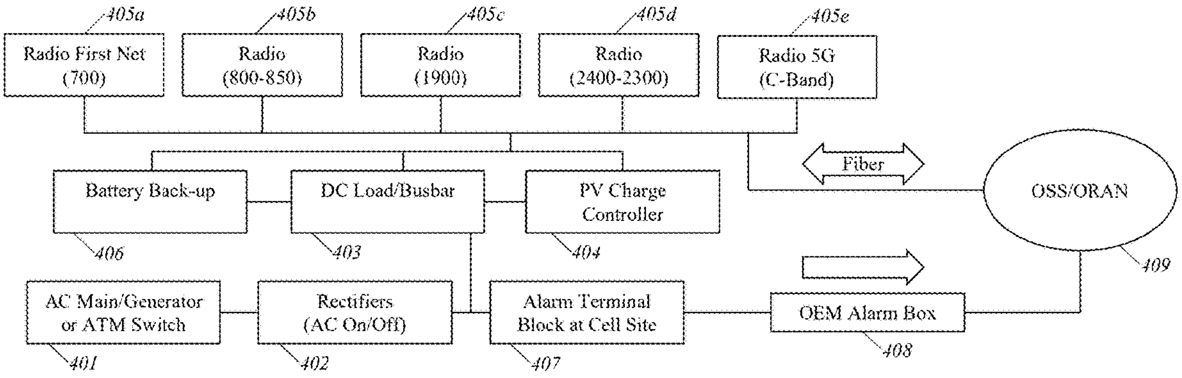
FIG. 4 shows an improved telecom power system diagram prepared in accordance with this disclosure.

FIG. 4 shows an improved system having a PV charge controller. It is understood that an MPPT charge controller or MPPT module may also be used in addition to, or in replacement for, a PV charge controller in such an embodiment to provide additional functionality.

The power system shown in FIG. 4 includes an AC Main/Generator or ATM Switch 401 configured to provide the primary AC power to the system. This component may include an automatic transfer switch (ATM) that switches between different power sources as appropriate. an AC Main/Generator or ATM Switch 401 is connected to Rectifiers (AC On/Off) 402 which are configured to convert AC (Alternating Current) power to DC (Direct Current) power. The rectifiers can be turned on or off based on the availability of AC power. In turn, the Rectifiers (AC On/Off) 402 are connected to the DC Load/Busbar 403 which distributes the DC power to various components of the system, ensuring a continuous power supply.

Also connected to the DC Load/Busbar 403 is PV Charge Controller 404 which regulates the flow of power from the solar panels to the batteries and loads in a solar photovoltaic system. Likewise connected to the DC Load/Busbar 403 is a Battery Backup 406 which can provide backup power in case of an AC power outage, ensuring continuous operation of the cell site. The Battery Backup 406 is connected with the is DC Load/Busbar 403 which distributes the DC power to various components of the system in the event of a power outage.

Connected to the Power System, which includes the PV Charge Controller 404, is DC Load/Busbar 403, Battery Backup 406, AC Main/Generator or ATM Switch 401, and Rectifiers (AC On/Off) 402 are Multiple radios **405*a* through 405*e* operating at different frequencies. In some configurations, the radios may include Radio FirstNet® (700 MHz) 405*a*, Radio (800-850 MHz) 405*b*, Radio (1900 MHz) 405*c*, Radio (2100/2300 MHz) 405*d*, and Radio 5G C-Band 405*e***.

The system also includes Alarm Terminal Block at Cell Site (Cabinet/Shelter) 407 which can send notifications of power outages to the OSS/ORAN. This block consolidates alarm signals and ensures timely communication of power issues.

The system also includes an OEM Alarm Box 408 which receives notifications from the Alarm Terminal Block and forwards them to OSS/ORAN system 409 for further action.

The OSS/ORAN (Operations Support System/Open Radio Access Network) 409 is a centralized system that monitors and manages the telecommunications network. It is notified of power outages to inform cell technicians, who may need to deploy a mobile generator to restore power and maintain continuous operation of the cell site.

Some systems utilize an MPPT instead of a PV, or in some embodiments, both may be used. The MPPT is the brain of the photovoltaic system, it coordinates work of solar panels, batteries, and loads—it can detect power generation of solar panel in real time. In various embodiments, the MPPT controller is communicably coupled to the battery strings in the system. It continuously monitors the voltage of the batteries. If the voltage difference between the batteries exceeds a certain threshold value, indicating a potential defect, the MPPT controller can trigger an alarm or send a notification for battery replacement dispatch. By utilizing the MPPT controller for battery defect monitoring, the system can ensure the reliability and performance of the batteries in the photovoltaic system. This monitoring functionality adds an extra layer of protection and helps to maintain the overall efficiency of the system.

In some embodiments, the MPPT is communicably coupled with the batteries and monitors the batteries for defect by comparing the sum of two battery voltages with the sum of another two batteries voltage of the same string. If the two sums are different by a certain threshold value based on the battery OEM specifications or other mitigation measures. If the difference exceeds the threshold amount, an alarm is sent out for battery maintenance. The alarm may be directed to the OSS/ORAN or to a power management/dispatch company.

Panel Optimization Through Circuit Switching

Additionally, The MPPT can detect power generation of solar panels in real time. By detecting the power generation of solar panels in real time, the system can maximize the effectiveness of the solar panels. Not all panels in an array may be capable of generating the same amount of power. For instance, some characteristics affecting power generation include solar panel efficiency, solar cell size, sunlight intensity, sunlight angle, connection of solar cells, solar panel output voltage, and temperature.

The MPPT module can maximize the power being generated by the array. One way to maximize effectiveness of a solar panel array is to switch the connections between panels within the array between series and parallel. This is because a series connection can increase voltage but can be less efficient if one panel is shorted, damaged, or shaded, at which point a parallel connection can increase current and improve efficiency under partial shading conditions. By dynamically switching between these conditions the system can maximize energy output throughout the day. In various embodiments one or more lux sensors may be used to determine the amount of light intensity received at any one panel or array.

For example, Using a Real Time Controller with Day Light Savings and a programmable microchip to control series and parallel connections at a given time, the output of a solar array can be maximized. In various configurations, this may include a real time clock connection with a microchip in connection with a circuit board control module for a series of panels. The switch from series to parallel may occur based on time of day or based on real time power monitoring of the panels.

Figure 5:
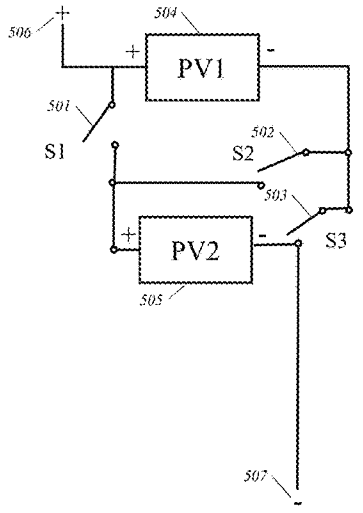
FIG. 5 shows wiring diagram configured to allow a solar panel array having two solar panels to change connections from series to parallel.
Figure 6:
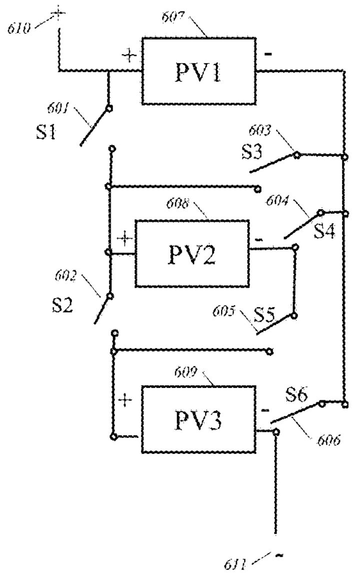
FIG. 6 shows wiring diagram configured to allow a solar panel array having three solar panels to change connections from series to parallel.
Figure 7:
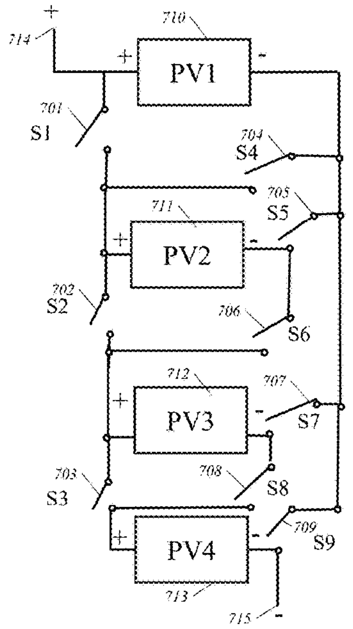
FIG. 7 shows wiring diagram configured to allow a solar panel array having four solar panels to change connections from series to parallel.

FIGS. 5-7 shows examples of connections configured to allow the circuit to change from series to parallel to optimize performance of the array.

FIG. 5 shows a circuit 500 designed to change two photovoltaic panels or modules PV1 504 and PV2 505 from series to parallel connections and vice versa through a series of switches S1 501, S2 502, and S3 503. In one embodiment, a control system comprising switches 501, 502, and 503 is configured to manage parallel and series electrical connections. When S1 501 and S3 503 are closed, they establish parallel connections, wherein their activation is delayed by a short interval of a few milliseconds to ensure proper synchronization. Switch S2 502, on the other hand, is configured to control series connections and is similarly programmed to close with a short delay of a few milliseconds.

To ensure safe operation, the system further incorporates a mechanism to introduce a time delay during transitions between parallel and series configurations, or vice versa. This delay is designed to prevent inadvertent simultaneous connections, which could otherwise result in overheating or damage to the system components. The described control methodology enhances reliability and operational safety in dynamic electrical switching environments.

As shown, the system also includes positive connection 506 and negative connection 507.

FIG. 6 shows a circuit designed to change three photovoltaic panels or modules PV1 607, PV2 608, and PV3 609 from series to parallel connections and vice versa through a series of switches S1 601-S6 606.

In one embodiment, switches S1 601, S2 602, S4 604, and S5 605 are configured to manage parallel electrical connections. When switches S1 601, S2 602, S4 604, and S5 605 are closed, they establish parallel connections, wherein their activation is delayed by a short interval of a few milliseconds to ensure proper synchronization and prevent electrical faults.

Switches S3 603 and S6 606, on the other hand, are configured to control series electrical connections. When switches S3 603 and S6 606 are closed, they establish series connections, with their activation also delayed by a short interval of a few milliseconds.

To ensure safe operation, the system further incorporates a mechanism to introduce a minimum time delay of one second during transitions between parallel and series configurations, or vice versa. This delay is designed to prevent inadvertent simultaneous connections, which could otherwise result in overheating or damage to the system components. The described control methodology enhances reliability and operational safety in dynamic electrical switching environments.

As shown, the system also includes positive connection 610 and negative connection 611.

FIG. 7 shows a circuit designed to change four photovoltaic panels or modules PV1 710, PV2 711, PV3 712, and PV4 713 from series to parallel connections and vice versa through a series of switches S1 701-S9 709.

The system comprises switches S1 701, S2 702, S3 703, S5 705, S7 707, and S9 709 configured to manage series and parallel electrical connections. When switches S1 701, S2 702, S3 703, S5 705, S7 707, and S9 709 are closed, they establish parallel connections, wherein their activation is delayed by a short interval of a few milliseconds to ensure proper synchronization.

Switches 704, 706, and 708, on the other hand, are configured to control series electrical connections. When switches 704, 706, and 708 are closed, they establish series connections, with their activation also delayed by a short interval of a few milliseconds.

To ensure safe operation, the system further incorporates a mechanism to introduce a time delay of a few milliseconds during transitions between parallel and series configurations, or vice versa. This delay is designed to prevent inadvertent simultaneous connections, which could otherwise result in overheating or damage to the system components. The described control methodology enhances reliability and operational safety in dynamic electrical switching environments.

As shown, the system also includes positive connection 714 and negative connection 715.

The systems shown herein are adaptable and versatile, making them suitable for use in commercial, industrial, or residential settings. For instance, the same assemblies can be adapted for residential and industrial applications by replacing the 56 VDC output DC-to-DC charge controller with a DC-to-AC inverter capable of providing 240 VAC.

Solar Configurations Useful for Present System

FIGS. 8A-E illustrate various configurations of solar panels that can be utilized in conjunction with the present disclosure.

Figure 8A:
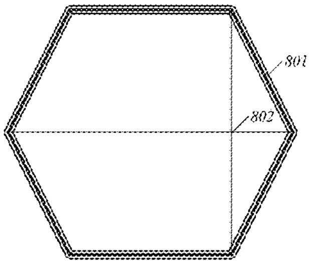
FIGS. 8A-F show different solar panel array configurations.
Figure 8B:
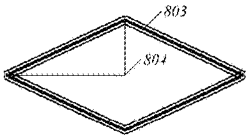
Figure 8C:
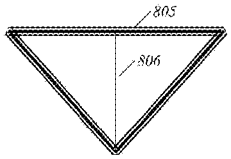
Figure 8D:
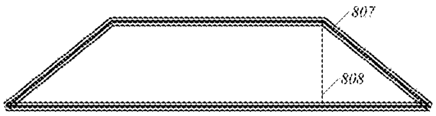
Figure 8E:
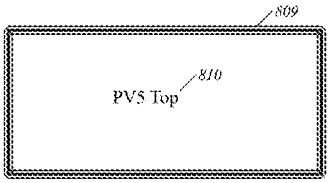
Figure 8F:
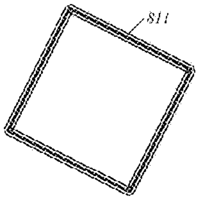

FIG. 8A shows a hexagonal solar panel array 801. In this configuration, each of the six faces of the hexagon include at least one solar panel in the array. A selection of right angles 802 are indicated highlighting the geometric alignment and positioning of the solar panels on each face to optimize sunlight capture throughout the day. Likewise, FIG. 8B shows a diamond solar panel array 803 also depicting a selection of right angles 804. FIG. 8C shows a triangular solar panel array along 805 with a selection of right angles 806. FIG. 8D shows a trapezoid solar panel array 807 and corresponding right angles 808. FIG. 8E shows a rectangular solar panel array 809 which may have at least a fifth solar panel 810 on the top side. FIG. 8F shows a square solar panel array 811, which may or may not include at least one solar panel on the top side.

The output of the various shapes, and their cost in comparison to a traditional 4 panel rooftop installation having a cross section of about 46.76 sq. ft. is shown in Table 1 below.

TABLE 1

| Shapes | No of 400 W PV | PV Panel Cost | Cross Section A, SQ FT | Ground area, SQ FT |
|---|---|---|---|---|
| Hexagonal | 6 | 1200 | 21.23 | 1 |
| Diamond | 4 | 800 | 18.38 | 1 |
| Triangle | 3 | 600 | 8.58 | 1 |
| Rectangle | 4 | 800 | 17.88 | 1 |
| Square | 5 | 1000 | 10.56 | 1 |

TABLE 1-continued

| | | | | |
|---|---|---|---|---|
| Trapazoid | 5 | 1000 | 11.26 | 1 |
| Rooftop | 4 | 800 | 46.76 | 46.76 |

| Shapes | Volume (6/8), Cubic FT | Amount DC Output kWh | Average Output per PV kWh |
|---|---|---|---|
| Hexagonal | 116.765 | 3225.78 | 537.63 |
| Diamond | 101.09 | 2245.8 | 561.45 |
| Triangle | 47.19 | 2068.9 | 689.63 |
| Rectangle | 98.34 | 2992.9 | 748.23 |
| Square | 58.08 | 2285.07 | 457.01 |
| Trapazoid | 61.93 | 2959.31 | 591.86 |
| Rooftop | 23.38 | 2858.17 | 714.54 |

These installations take lower volume of space to install and yield a higher volume of panel space as shown in Table 2

TABLE 2

| Type | Cross Section (sq. ft.) | Volume (cubic ft) |
|---|---|---|
| Hexagonal | 21.23 | 116.765 |
| Diamond | 18.38 | 101.09 |
| Triangular | 8.58 | 47.19 |
| Rectangular | 17.88 | 98.34 |
| Square | 10.56 | 58.08 |
| Trapezoid | 11.26 | 61.93 |
| Traditional Roof | 46.76 | 23.38 |

Figure 9A:
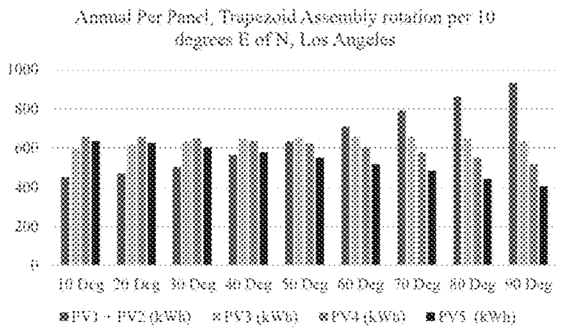
FIGS. 9A-B show data relating to panel array generation based on rotation.
Figure 9B:
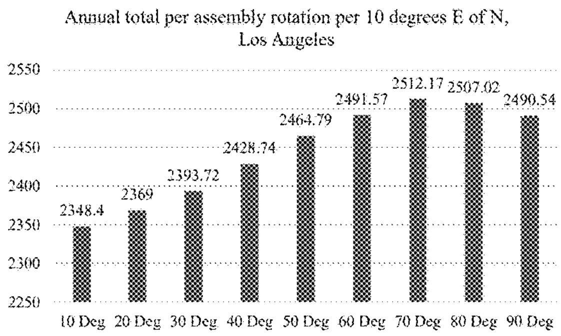

Furthermore, these assemblies can be rotated to improve their yield throughout the year, as the sun position changes in the sky. FIGS. 9A-B show graphs showing the annual total output per assembly rotation.

FIG. 9A shows the annual total output per assembly rotation 10 degrees E of N in Los Angeles. The data represents the annual energy output of individual solar panels within a trapezoid assembly, measured at different rotational angles from 10 degrees to 90 degrees East of North, specifically for the location of Los Angeles. From the data, it is shown that certain angles yield higher energy outputs for specific panels. For example, at 90 degrees, PV3 and PV5 show higher energy outputs compared to other angles.

FIG. 9B shows the annual per panel output for a trapezoid assembly per rotation 10. The data shows that rotating the assembly affects the power output per assembly rotation 10 degrees E of N in Los Angeles. FIG. 9B illustrates the annual total energy output for the entire trapezoid assembly at various rotational angles. The Y-axis represents the total annual energy output in kilowatt-hours (kWh), and the X-axis denotes the rotational angles from 10 degrees to 90 degrees East of North.

The data shown in FIGS. 9A-9B shows that individual panel performance and total assembly performance must be considered to determine the most effective rotational angle for solar energy generation, and that different angles may be capable of producing different amounts of energy. The assembly can be rotated manually or by motor, such as under the control of an MPPT or similar. Similarly, the connections between panels in the array can be changed from series to parallel as the panel is rotated or as the sun moves through the sky. This functionality cannot be achieved with traditional rooftop installation.

In various configurations, spacing of the assemblies can become important. To avoid shading between the assemblies, a spacing of 12 feet from south to north is proposed. This spacing ensures that during the shortest day of the year, when the sun is at its lowest altitude, there will be no shadow cast by the southern assembly onto the northern assembly between 10 AM and 2 PM. If we utilize solar panels equipped with two diodes that divide the panel into separate circuits, the assemblies can be placed 4 feet closer together from south to north. This configuration may lead to reduced energy absorption by the lower portions of the front three panels of the northern assemblies between 8:30 AM and 3:30 PM, and only during the period from mid-December to mid-January.

If alternative shapes are used for solar assemblies, different methods of connecting the panels within the same assembly may be necessary at various times of the day, depending on the sun's intensity and the angle of incidence on each specific panel within the assembly. Additionally, it may be required to achieve a higher output voltage from the assembly.

As discussed above, the MPPT module is able to determine the output of each panel within the assembly and is able to control one or more of the rotation of the assembly, the height of the assembly, and the connections between the different panels in the array of the assembly based on output, time, date, and the like.

System Overview

Figure 10:
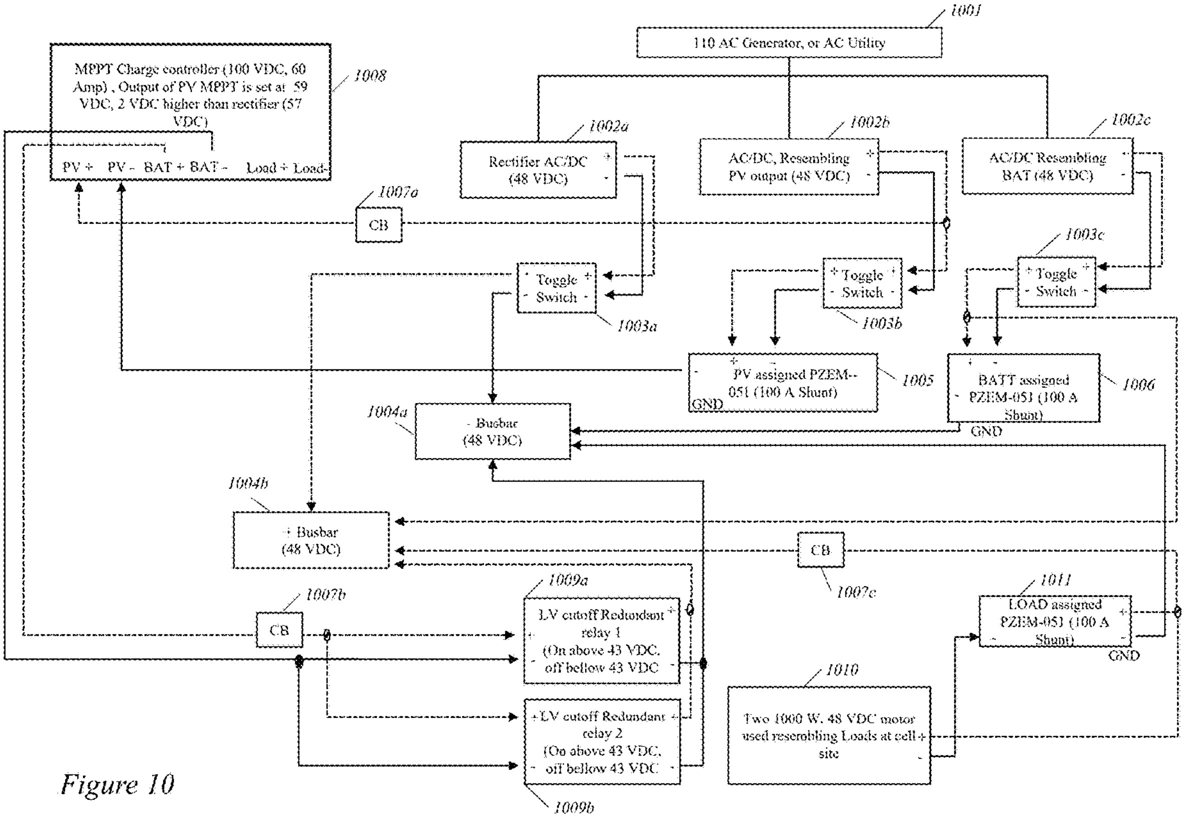
FIGS. 10-11 show various embodiments for an improved, resilient telecom power system.

FIG. 10 illustrates an example system for testing and implementing the features described herein. FIG. 10 shows one example embodiment that includes a 110 AC generator or an AC utility primary power source, along with an MPPT charge controller (100 VDC, 60 Amp) designed to manage power and charging from photovoltaic (PV) sources, with the output set at 59 VDC.

A selection of the components of the system are described below. It is understood that the system may contain additional or alternate elements, and that no single element is indispensable.

The system includes a power supply 1001 which is shown as a 110 AC Generator or AC Utility-a source of alternating current (AC) power that can be used to supply energy to the system. Here, a 110 generator refers to a generator that produces 110 volts of AC power. It is typically used as a backup power source during outages when the main AC utility power is unavailable. Likewise, AC Utility refers to the main grid electricity supplied by an electric utility company, providing 110 volts of AC power. When AC utility power is available, it serves as the primary source of energy for the system. During power outages, the generator can be used to provide AC power.

The AC power is converted to DC power (48 VDC) using rectifiers 1002*a*, 1002*b*, and 1002*c* which can be rectifiers or AC/DC converters or the like, each converting the AC power supplied by the power supply 1001 (such as a generator or utility) to 48 VDC, which is utilized throughout the system for various purposes, including powering loads and charging batteries.

Rectifier AC/DC (48 VDC) 1002*a* converts AC power (from the generator or utility 1001) to 48 VDC.

Rectifier AC/DC Resembling PV Output (48 VDC) 1002*b* provides DC power similar to the output of photovoltaic (PV) panels. This converts AC power to 48 VDC for compatibility with the rest of the system. Notably, the Rectifier AC/DC Resembling PV Output (48 VDC) 1002*b* positive terminal is connected to the PV+ terminal of the MPPT controller 1008 through circuit breaker 1007*a*. The circuit breaker provides safety by cutting off the connection in case of an electrical fault, protecting the system components from damage.

Rectifier AC/DC Resembling BAT Output (48 VDC) 1002*c* provides DC power similar to the output of batteries. Rectifier 1002*c* also converts AC power to 48 VDC to ensure compatibility with the rest of the system, thus maintaining a consistent DC voltage across the system components.

Rectifiers 1002*a*, 1002*b*, and 1002*c* discussed above are connected to toggle switches 1003*a*, 1003*b*, and 1003*c*, respectively. These toggle switches allow control of the connection of each respective rectifier to the system. The toggle switches may be under automated or manual control.

Toggle switch 1003*a* connects the output of the Rectifier AC/DC (48 VDC) 1002*a* to the busbars 1004*a* and 1004*b*. This toggle switch allows the AC power converted by the rectifier to be distributed throughout the system, ensuring that the converted DC power can be utilized by the various components and loads connected to the busbars.

Toggle switch 1003*b* connects the output of the Rectifier AC/DC resembling PV Output (48 VDC) 1002*b* to the MPPT Charge Controller 1008 through a power monitoring device 1005*a*, which here is a PV Assigned PZEM-051 that monitors the voltage, current, power, and energy associated with the input, although it is understood any suitable monitoring device may be utilized. This configuration enables the system to use AC power converted to simulate PV panel output.

Toggle switch 1003*c* connects the output of the Rectifier AC/DC resembling BAT Output (48 VDC) 1002*c* to a power monitoring device 1006, which here is a PV Assigned PZEM-051, and to busbar 1004*b*. Again, although a PZEM-051 is utilized here, it is understood that any suitable monitoring device may be utilized. The output of the power monitoring device 1006 is connected to busbar 1004*a*.

In the depicted embodiment, the MPPT Charge Controller 1008 optimizes power transfer to ensure efficient charging and power distribution within the system. This optimization allows the system to maximize energy harvest from the PV panels or simulated PV output and effectively distribute this energy to the connected loads and batteries.

Specifically, the output from the BAT+ terminal of the MPPT Charge Controller 1008 is routed through the circuit breaker 1007*b* for protection. The circuit breaker 1007*b* serves as a safety measure to isolate the system in the event of an electrical fault, such as overcurrent or short circuits, thereby protecting the system components from damage. After passing through the circuit breaker 1007*b*, the power is directed to the low voltage cutoff relay 1 1009*a*. The low voltage cutoff relay 1 1009*a* is designed to disconnect the load when the voltage drops below a predefined threshold, preventing the batteries from deep discharge.

The MPPT Charge Controller 1008 also includes a parallel connection where the MPPT output is routed directly to the first and second low voltage cutoff relays 1009*a* and 1009*b* without passing through the circuit breaker 1007*b*. This configuration ensures that the power from the MPPT Charge Controller can still reach the low voltage cutoff relays 1009*a* and 1009*b*, maintaining functionality in certain conditions. However, it is important to note that this parallel path does not have the same level of protection as the path through the circuit breaker. The low voltage cutoff relays 1009*a* and 1009*b* are responsible for disconnecting the load when the voltage drops below a predefined threshold, thereby preventing deep discharge of the batteries and ensuring system reliability.

In turn, the low voltage cutoff relay 1 1009*a* and low voltage cutoff relay 2 (1009*b*) are connected to the busbars 1004*a* (positive busbar) and 1004*b* (negative busbar), respectively. These connections ensure that the relays can effectively manage the distribution of power to the system by disconnecting the load from the busbars when the voltage falls below a certain threshold. This setup helps in protecting the batteries from deep discharge and maintaining the overall reliability and longevity of the power system.

Additionally depicted is a load connected to the system. In this embodiment, the load 1010 consists of two 1,000 W 48 VDC motors, which resemble the types of loads typically found at a cell site. Load 1010 is connected to a power monitor 1011, which tracks the voltage, current, power, and energy consumption of the load. For protection, load 1010 is also connected to a circuit breaker 1007*c*. The circuit breaker 1007*c* serves to isolate the load in the event of an electrical fault, such as an overcurrent or short circuit, thereby protecting the system components from potential damage.

The circuit breaker 1007*c* is connected to the negative busbar 1004*b*. This connection ensures that the load 1010, which is protected by the circuit breaker 1007*c*, is properly integrated into the power distribution system. By connecting to the negative busbar 1004*b*, the circuit breaker 1007*c* can effectively isolate the load 1010 in the event of an electrical fault, such as an overcurrent or short circuit, thereby protecting the system components from potential damage and maintaining overall system safety and reliability.

Power monitor 1011 is connected to the circuit breaker 1007*c* and the positive busbar 1004*a*. This configuration allows the power monitor 1011 to measure and track the electrical parameters of the load 1010, such as voltage, current, power, and energy consumption, while ensuring that the load is protected by the circuit breaker 1007*c*. By connecting to the positive busbar 1004*a*, the power monitor 1011 can accurately monitor the power being supplied to the load 1010 from the power distribution system. The connection to the circuit breaker 1007*c* ensures that the power monitor 1011 can also detect and respond to any electrical faults, such as overcurrent or short circuits, thereby enhancing the overall safety and reliability of the system.

As used herein, LV cutoff, or Low Voltage cutoff, is a protective feature used in electrical systems to prevent batteries from discharging below a certain voltage threshold. This is critical to avoid damaging the batteries and ensuring the reliable operation of connected loads. The LV cutoff mechanism typically involves relays or electronic circuits that disconnect the load from the batteries when the voltage drops below a preset level.

Likewise, the PZEM-051 is a multifunctional digital power meter module which measures and displays key electrical parameters, including voltage, current, power (watts), energy consumption (watt-hours), frequency, and power factor. It provides real-time monitoring and data logging capabilities, with interfaces for microcontrollers or monitoring systems such as through a digital display. Others may be used.

Figure 11:
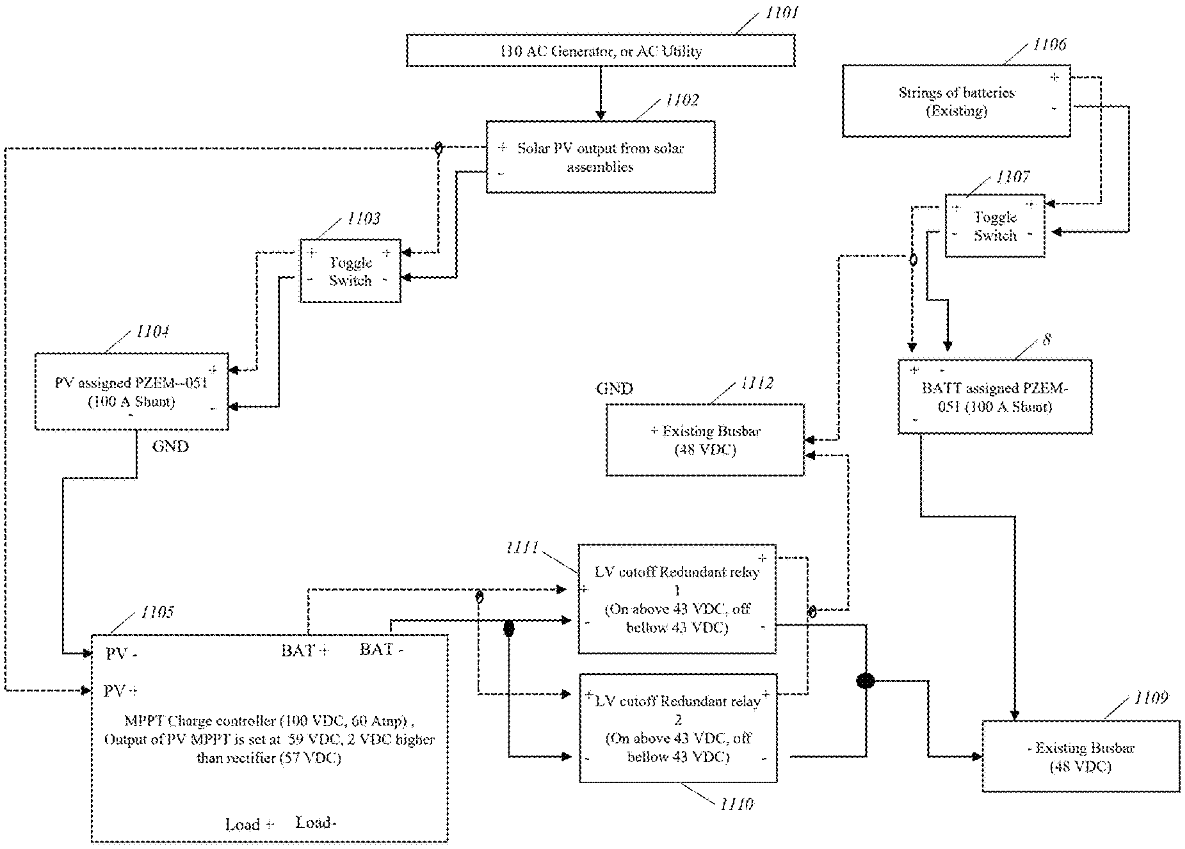

FIG. 11 further elaborates on the concepts illustrated in FIG. 10 by explicitly integrating solar power generation, enhancing battery management through the use of redundant relays, and incorporating comprehensive monitoring and control functionalities via PZEM-051 modules. This embodiment demonstrates the integration of these components into an existing infrastructure, with an emphasis on practical implementation and improvements in operational efficiency.

In FIG. 11 a power source 1101 is shown—in this embodiment, a 110 AC Generator or AC Utility. Power source 1101 is connected to Solar PV output from solar assemblies 1102. As used herein, a solar PV assembly may refer to a solar photovoltaic (PV) system configured to convert sunlight into electrical energy using solar panels. It is understood that an MPPT Module may also be used in conjunction with the present embodiment.

The solar assemblies 1102 are connected to toggle switch 1103, and the positive terminal of the assemblies may also be connected to the PV+ terminal of the MPPT charge controller 1105.

In turn, the toggle switch 1103 is connected to a PV assigned PZEM power monitoring unit 1104, which is in turn connected to the PV-terminal of the MPPT charge controller 1105. In this way, control of the PV output can be controlled based on the detected output of the PV array.

Also shown in FIG. 11 is a string of batteries 1106. The string of batteries 1106 is connected to a toggle switch 1107, which is in turn connected to a BATT assigned PZEM monitoring unit 1108, and also to Positive Busbar 1112. The BATT assigned PZEM monitoring unit 1108 is connected to Negative Busbar 1109.

The MPPT Charge Controller 1105 shares connections with the LV Cutoff Redundant Relay 1 1110 and Relay 2 1111. In this embodiment, the system includes a low-voltage (LV) cutoff relay configured to operate at 43 VDC to prevent photovoltaic (PV) battery charging. The system is configured to disconnect the battery at a threshold voltage of 42 VDC during power outage conditions. In scenarios where the battery voltage falls below 42 VDC and PV charging or load powering is momentarily allowed, a voltage drop below the threshold may occur. Such a drop of voltage could result in the unintended cycling of connected equipment (i.e., turning it off and back on), which is deemed undesirable for operational stability. In turn, the Redundant Relay 1 1110 and Relay 2 1111 are connected with the Negative Busbar 1109.

Lux Sensor

In some embodiments, one or more lux sensors may be utilized in conjunction with the presently disclosed systems. A lux sensor such as a TEMT6200FX01 may be utilized, which has a maximum allowable current of 20 mA and a photo current of 18 mA at 100,000 lux. A lux sensor can be tuned to turn a relay on at high sun intensity.

Figure 12:
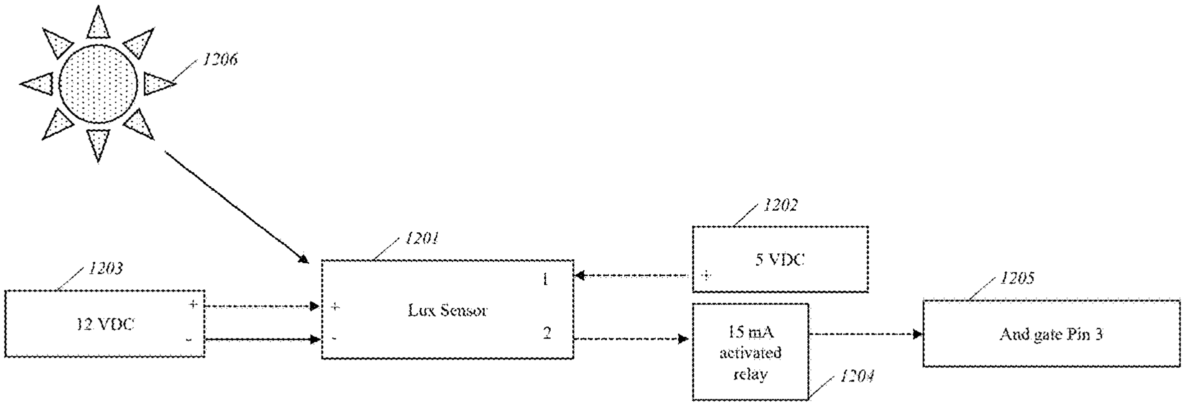
FIG. 12 shows a schematic for a lux sensor connection to the power system.

A suitable configuration for a Lux sensor is shown in FIG. 12 in which a Lux Sensor 1201 receives input from a busbar 1202, such as through a voltage regulator or DC-DC converter that steps down the voltage from 48 VDC to 5 VDC. the Lux Sensor 1201 also receives input 1203 from 48 VDC (volts direct current) is being converted to 12 VDC, which may be performed by a DC-DC converter or voltage regulator. Finally, the Lux Sensor 1201 is connected to a 15 mA activated relay 1204, which is designed to switch or trigger when it receives a current of 15 mA. It acts as an intermediary to control the signal sent to the AND gate pin 3 1205 which can control further functionality based on the amount of sunlight 1206 received at the sensor 1201.

Certain Voltage Monitoring Systems

Figure 13:
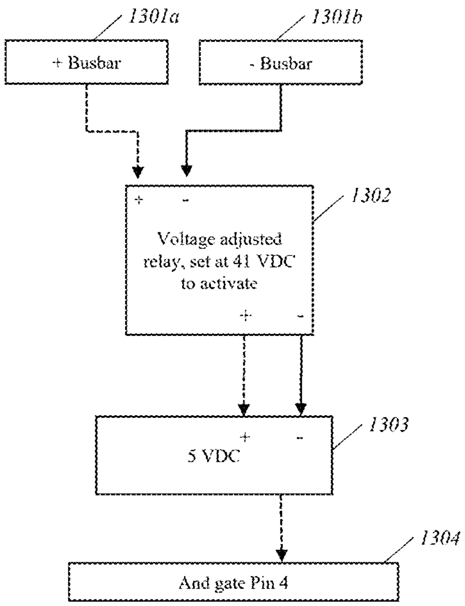
FIG. 13 shows a schematic for battery health monitoring and charging through the MPPT.

One example configuration suitable for voltage monitoring is shown in FIG. 13. FIG. 13 shows Positive and Negative Busbar Terminals 1301*a* and 1301*b* connected to a voltage adjusted relay 1302 set at 41 VDC to activate, and in turn connected to the input from busbar 1303 which may be converted from 48 VDC to 5 VDC such as through a DC-DC converter or voltage regulator. The signal terminates at AND gate pin 4 1304.

Figure 14:
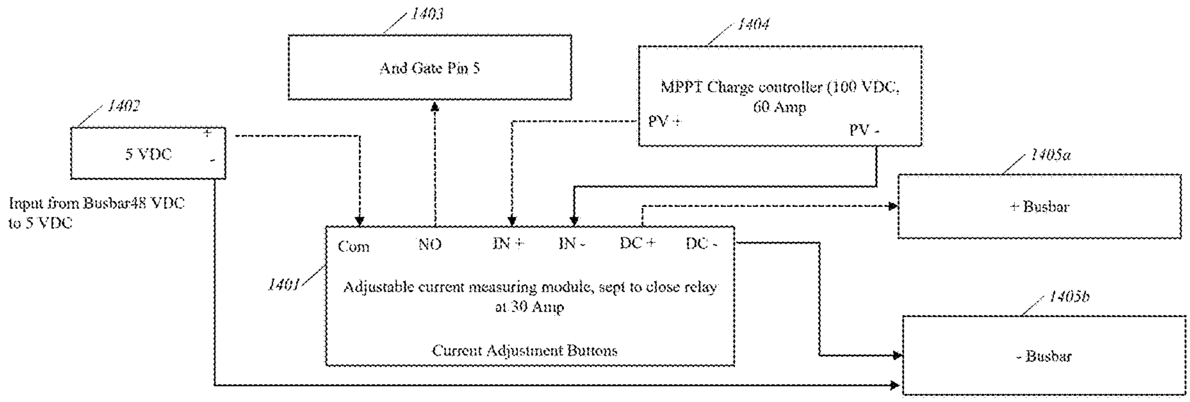
FIG. 14 shows a schematic to verify solar panel operation through the MPPT.

FIG. 14 shows one embodiment of a configuration suitable to implement a PV Solar current measurement to verify that solar panels have no defect and generate a minimum of 30 Amps, such as by a specified period of time, such as by 10 AM.

FIG. 14 shows an input from busbar 1402 converted from 48 VDC to 5 VDC such as through a DC-DC converter or voltage regulator. The input is routed to an adjustable current measuring module 1401 set to close the relay at 30 Amps thereby activating the circuit and having current adjustment buttons. Module 1401 shares connections with AND gate pin 5 1403, the MPPT Charge Controller 1404, and the positive and negative busbar 1405*a* and 1405*b*. In this manner, the PV Solar current is measured to verify that the solar panels have no defects and can generate a minimum of 30 Amps by 10 AM. For example, NO may normally be open and when current reaches 30 amps, set to close and activate the circuit.

Figure 15:
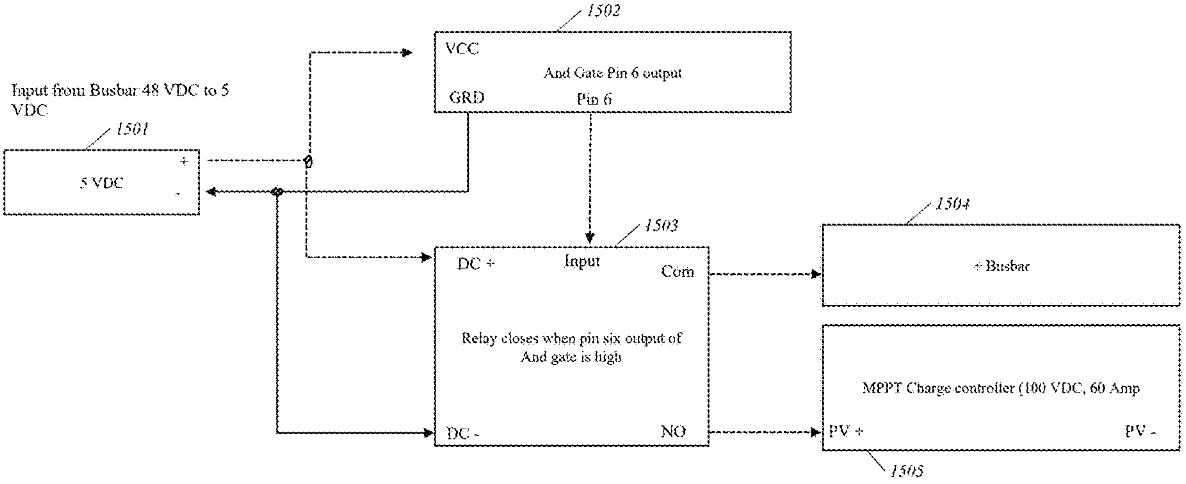
FIG. 15 shows a schematic diagram illustrating the configuration and operation of a charging control circuit for a photovoltaic (PV) solar system.

FIG. 15 shows a schematic diagram illustrating the configuration and operation of a charging control circuit for a photovoltaic (PV) solar system. FIG. 15 shows how an AND gate (74LS11) is used to control the charging of a battery by the PV solar system, ensuring that charging only occurs when certain conditions are met. As shown, an input from busbar 1501 converted from 48 VDC to 5 VDC such as through a DC-DC converter or voltage regulator. The input is routed to AND gate pin 6 output 1502, which allows charging of battery by PV solar when all conditions are met. The input from busbar 1501 is also routed to an Input Relay 1503 configured to close when the AND gate pin 6 output 1502 signal is high. In turn, the Input Relay 1503 shares connections with the positive busbar 1504 and MPPT charge Controller 1505.

FIG. 15 shows a schematic diagram illustrating the configuration and operation of a charging control circuit for a photovoltaic (PV) solar system. For instance, FIG. 15 demonstrates how an AND gate (74LS11) is employed to regulate the charging of a battery by the PV solar system, ensuring that charging occurs only when specific conditions are met.

As depicted, an input from busbar 1501, which is converted from 48 VDC to 5 VDC via a DC-DC converter or voltage regulator, is provided. This 5 VDC input is routed to the AND gate pin 6 output 1502. The AND gate 1502 allows the charging of the battery by the PV solar system when all required conditions are satisfied.

The input from busbar 1501 is also directed to an Input Relay 1503. The Input Relay 1503 is configured to close when the signal from the AND gate pin 6 output 1502 is high, indicating that the conditions for charging are met. When the Input Relay 1503 closes, it establishes a connection between the positive busbar 1504 and the MPPT charge controller 1505. The MPPT charge controller 1505 is responsible for optimizing the power output from the PV panels and ensuring efficient charging of the battery by controlling the current flow to the positive busbar 1504.

What is claimed is:

1. A system for enhancing energy resilience and optimizing energy consumption, the system comprising:

a utility power source;

a plurality of solar assemblies providing a solar PV output;

a PV assigned power monitoring unit connected through a PV assigned toggle switch to the solar PV output;

an MPPT charge controller connected to the PV assigned power monitoring unit, and configured to optimize the output of the solar assemblies;

a string of batteries connected through a battery assigned toggle switch to a battery assigned power monitoring unit, the battery assigned power monitoring unit further connected to a negative busbar;

the battery assigned toggle switch further connected to a positive busbar; and wherein the MPPT charge controller is further connected to the positive busbar and the negative busbar through a redundant relay system comprising at least:

Redundant Relay 1 and Redundant Relay 2.

2. The redundant Relay 1 and Redundant Relay 2 of claim 1, being configured to operate at a threshold voltage of 43 VDC to prevent photovoltaic (PV) battery charging, and further configured to disconnect the battery at a threshold voltage of 42 VDC during power outage conditions.

3. The redundant Relay 1 and Redundant Relay 2 of claim 1, being configured to operate at 43 VDC to prevent PV battery charging and to turn off below 43 VDC.

4. The system of claim 1, wherein the MPPT charge controller is configured to monitor battery health via battery monitoring inputs.

5. The system of claim 4, wherein the MPPT charge controller is configured to generate an alert upon detecting that the sum of a first two batteries' voltages differs from the sum of a second two batteries' voltages within the same string by a predefined voltage value.

6. A power resiliency system integrated into an existing cellular telecommunications site, the existing cellular telecommunications site having an existing positive busbar, an existing negative busbar, a telecommunications site utility power source connected to a telecommunications site rectifier having a rectifier output voltage, the power resiliency system comprising:

one or more solar assemblies providing a solar photovoltaic (PV) output;

a PV assigned power monitoring unit connected through a PV assigned toggle switch to the solar PV output, the PV assigned power monitoring unit being configured to measure current and voltage of the solar photovoltaic output;

an MPPT charge controller connected to the PV assigned power monitoring unit and having an output voltage set above the rectifier output voltage;

a battery string of the cellular telecommunications site connected through a battery assigned toggle switch to a battery assigned power monitoring unit, the battery assigned power monitoring unit being connected to the existing negative busbar, and the battery assigned toggle switch being connected to the existing positive busbar; and a redundant relay system connecting the MPPT charge controller to the existing positive busbar and the existing negative busbar, the redundant relay system comprising a first redundant relay and a second redundant relay.

7. The system of claim 6, wherein the output voltage of the MPPT charge controller is set about 2 VDC higher than the rectifier output voltage.

8. The system of claim 6, wherein the output voltage of the MPPT charge controller is set about 2 VDC higher than the rectifier output voltage such that the MPPT charge controller is configured to power the busbars using photovoltaic input when the MPPT voltage exceeds the rectifier voltage.

9. The system of claim 6, wherein the redundant relay system is configured to operate at about 43 VDC to prevent photovoltaic battery charging.

10. The system of claim 9, wherein the redundant relay system is configured to disconnect the battery at about 42 VDC during power outage conditions to prevent unintended cycling of connected equipment.

11. The system of claim 6, wherein, when voltage on the existing positive busbar and the existing negative busbar reaches 56 VDC, the MPPT charge controller is configured to resume powering the existing positive busbar and the existing negative busbar.

12. The system of claim 9, wherein the redundant relay system is configured to electrically connect the MPPT charge controller to the existing positive busbar and the existing negative busbar when voltage is above about 43 VDC, and to electrically disconnect the MPPT charge controller from the existing positive busbar and the existing negative busbar when voltage is below about 43 VDC.

13. The system of claim 6, wherein the MPPT charge controller comprises a BAT+output and a BAT−output, and wherein the first redundant relay is connected to the BAT+ output of the MPPT charge controller and to the existing positive busbar, and the second redundant relay is connected to the BAT−output of the MPPT charge controller and to the existing negative busbar.

14. The system of claim 6, wherein the battery string of the cellular telecommunications site is an existing string of batteries; and wherein the MPPT charge controller comprises battery monitoring inputs and is configured to monitor battery health of the existing string of batteries by comparing a sum of voltages of a first two batteries in the existing string of batteries with a sum of voltages of a second two batteries in the existing string of batteries, and to generate an indication when a difference between the sum of voltages of the first two batteries and the sum of voltages of the second two batteries exceeds a threshold value.

15. A cellular telecommunications site power system comprising:

an existing positive 48 VDC telecom busbar and an existing negative 48 VDC telecom busbar at the cellular telecommunications site;

an AC power source connected to a rectifier having a rectifier output voltage;

one or more solar photovoltaic assemblies providing a solar photovoltaic output;

a PV assigned power monitoring unit connected through a PV assigned toggle switch to the solar photovoltaic output, the PV assigned power monitoring unit being configured to measure current and voltage of the solar photovoltaic output;

an MPPT charge controller connected to the PV assigned power monitoring unit and configured to receive the solar photovoltaic output, the MPPT charge controller comprising a BAT+output, a BAT−output, and battery monitoring inputs, the MPPT charge controller having an output voltage set about 2 VDC higher than the rectifier output voltage;

an existing string of batteries connected through a battery assigned toggle switch to a battery assigned power monitoring unit, the battery assigned toggle switch being connected to the existing positive 48 VDC telecom busbar and the battery assigned power monitoring unit being connected to the existing negative 48 VDC telecom busbar, the battery assigned power monitoring unit being configured to measure current and voltage of the existing string of batteries; and a redundant relay system connecting the BAT+output and the BAT−output of the MPPT charge controller to the existing positive 48 VDC telecom busbar and the existing negative 48 VDC telecom busbar, respectively, the redundant relay system comprising at least a first low-voltage cutoff relay and a second low-voltage cutoff relay, wherein the first low-voltage cutoff relay is connected to the BAT+output of the MPPT charge controller and to the existing positive 48 VDC telecom busbar, and the second low-voltage cutoff relay is connected to the BAT−output of the MPPT charge controller and to the existing negative 48 VDC telecom busbar, wherein the redundant relay system is configured to operate at about 43 VDC to prevent photovoltaic battery charging, wherein the redundant relay system is configured to disconnect the battery at about 42 VDC during AC outage conditions to prevent unintended cycling of equipment connected to the existing positive 48 VDC telecom busbar and the existing negative 48 VDC telecom busbar, wherein the redundant relay system is configured to electrically connect the MPPT charge controller to the existing positive 48 VDC telecom busbar and the existing negative 48 VDC telecom busbar when voltage is above about 43 VDC, and to electrically disconnect the MPPT charge controller from the existing positive 48 VDC telecom busbar and the existing negative 48 VDC telecom busbar when voltage is below about 43 VDC, and wherein the MPPT charge controller is configured to monitor battery health of the existing string of batteries by comparing a sum of voltages of a first two batteries in the existing string of batteries with a sum of voltages of a second two batteries in the existing string of batteries, and to generate an indication when a difference between the sum of voltages of the first two batteries and the sum of voltages of the second two batteries exceeds a threshold value.

* * * * *